United States Patent
Johnson et al.

(10) Patent No.: US 10,838,608 B2
(45) Date of Patent: *Nov. 17, 2020

(54) SMOOTH SCROLLING OF A STRUCTURED DOCUMENT PRESENTED IN A GRAPHICAL USER INTERFACE WITH BOUNDED MEMORY CONSUMPTION

(71) Applicant: Facebook, Inc., Menlo Park, CA (US)

(72) Inventors: Michael Dudley Johnson, San Mateo, CA (US); Yohann Richard, Cupertino, CA (US); Hsi Wang, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 15/648,375

(22) Filed: Jul. 12, 2017

(65) Prior Publication Data

US 2017/0308256 A1 Oct. 26, 2017

Related U.S. Application Data

(63) Continuation of application No. 13/325,305, filed on Dec. 14, 2011, now Pat. No. 9,733,819.

(51) Int. Cl.
*G06F 3/0485* (2013.01)
*G06F 3/14* (2006.01)

(52) U.S. Cl.
CPC .......... *G06F 3/0485* (2013.01); *G06F 3/1438* (2013.01)

(58) Field of Classification Search
CPC .... G06Q 50/01; G06Q 30/02; G06Q 30/0269; G06Q 30/0282; G06F 17/3089; G06F 17/30861; G06F 3/0485
See application file for complete search history.

(56) References Cited

U.S. PATENT DOCUMENTS

| 7,669,123 B2* | 2/2010 | Zuckerberg | G06F 17/2235 715/273 |
| 2009/0228782 A1* | 9/2009 | Fraser | G06F 16/9577 715/234 |
| 2010/0095239 A1* | 4/2010 | McCommons | G06F 3/04855 715/784 |
| 2010/0205563 A1* | 8/2010 | Haapsaari | G06F 3/04883 715/825 |
| 2012/0079429 A1* | 3/2012 | Stathacopoulos | G06F 16/90335 715/830 |
| 2012/0144343 A1* | 6/2012 | Tseng | G06F 3/0482 715/834 |

(Continued)

OTHER PUBLICATIONS

Synonyms for render, Thesaurus.com, Jan. 6, 2018 (Year: 2018).*

*Primary Examiner* — Ariel Mercado
(74) *Attorney, Agent, or Firm* — Jordan IP Law, LLC (57) ABSTRACT

In one embodiment, one or more main processors of a device detect an event corresponding to scrolling a structured document presented in a scrollable graphical user interface of an application executed by the one or more main processors. The main processors, in response to the event, determine a first set of elements and a second set of elements of the structured document; render the first set of elements of the structured document for presentation in the graphical user interface; and cause one or more graphics processors of the device to render the second set of elements for presentation in the graphical user interface.

20 Claims, 6 Drawing Sheets

(56) References Cited

U.S. PATENT DOCUMENTS

2012/0159381 A1\* 6/2012 Tseng ................... G06F 3/0485
715/784
2013/0111330 A1\* 5/2013 Staikos .................. G06F 17/21
715/241

\* cited by examiner

SMOOTH SCROLLING OF A STRUCTURED DOCUMENT PRESENTED IN A GRAPHICAL USER INTERFACE WITH BOUNDED MEMORY CONSUMPTION

PRIORITY CLAIM

This application claims priority to and is a continuation of U.S. patent application Ser. No. 13/325,305, filed 14 Dec. 2011, and titled "SMOOTH SCROLLING OF A STRUCTURED DOCUMENT PRESENTED IN A GRAPHICAL USER INTERFACE WITH BOUNDED MEMORY CONSUMPTION", granted as U.S. Pat. No. 9,733,819, which is hereby incorporated by reference for all purposes.

TECHNICAL FIELD

This disclosure generally relates to user interfaces.

BACKGROUND

A structured document, such as a web page, may include page content such as text and images, layout information, and scripting codes. A layout engine is a software component containing code for rendering structured documents in a graphical user interface. A graphics processor or graphics processing unit (GPU) is a specialized circuit for efficiently manipulating geometrical representation of computer graphics and generating images for output to a display of a computing device. A GPU may include one or more integrated circuits or processing cores for carrying out mathematical operations commonly used in graphics rendering. A GPU may use a special graphics-unit instruction set or a central processing unit (CPU) or CPU-like (e.g. a modified x86) instruction set. A GPU may implement a number of graphics primitive operations, such as blitting, texture mapping, pixel shading, and frame buffering. In additional to three-dimensional (3D) hardware, a GPU may include basic two-dimensional (2D) acceleration and frame buffer capabilities. In addition, a GPU may support YUV color space and hardware overlays, as well as Motion Picture Experts Group (MPEG) primitives (such as motion compensation and inverse discrete cosine transform (iDCT)). A GPU may be a graphics accelerator, a general-purpose GPU (GPGPU), or any other suitable processor or processing unit. A GPU may be an individual chip in a computing device or part of a chip or multi-chip module containing a main processor of a computing device. A software application may access a GPU with an application programming interface (API) to the GPU. Examples of GPU APIs are OPENGL (managed by KHRONOS GROUP) and DIRECT3D by MICROSOFT.

DESCRIPTION OF EXAMPLE EMBODIMENTS

A structured document such as a web page may include, for example, page layout information (e.g., frames), scripts, page content such as text (e.g., ASCII or HTML), media data (e.g., images, video clips, or animations), and executable code objects (e.g., a game executable within a browser window or frame). Structured documents may be implemented with languages and technologies such as Hypertext Markup Language (HTML), Extensible Markup Language (XML), Extensible Hypertext Markup Language (XHTML), JAVASCRIPT, WEBGL, Cascading Style Sheet (CSS) including CSS animations and transitions, and, frequently, JAVA. A structured document may itself include references to multiple structured documents and contents. For example, a web page may include one or more inline references by incorporating Uniform Resource Locations (URL's) or script code (e.g., JAVASCRIPT, PHP, or AJAX) that in response to a user event (e.g., a mouse click, a mouse hover-over), causes an application displaying the web page in a graphical user interface to dynamically retrieve content specified by an URL and the script code.

A layout engine (or web browser engine) is a software component or library for rendering structured documents in a graphical user interface. For example, GOOGLE's CHROME web browser and APPLE's SAFARI web browser use WebKit software to render web pages. WebKit includes a layout engine WebCore and a JAVASCRIPT engine JavaScriptCore (for interpreting and executes JAVASCRIPT code). An application hosted by a computing device may utilize a layout engine to render structured documents by incorporating modules in the layout engine via an application programming interface (API) to the layout engine.

When a user views a structured document with a large amount of content (e.g., text, or media data) in a graphical user interface of an application (e.g., a web browser), the application may render only content within the graphical user interface. The application may render additional content of the structured document as the user scrolls up or down the structured document in the graphical user interface. The application may render additional content of the structured document before the user scrolls up or down the structured document to improve visual experience for the user. However, rendering too much content of the structured document before the user scrolls up or down the structured document may deteriorate the visual experience (e.g., choppy scrolling, frozen screen) with limited hardware resources. For example, rendering a large amount of media data may take too long on the main processor of a computing device as the large amount of media data being constantly swapped in and out from a main memory (e.g., a dynamic random access memory) of the computing device. Particular embodiments describe methods of rendering a structured document. Particular embodiments may improve rendering performance and user experience by accelerating rendering media content with one or more graphics processors.

Figure 1:
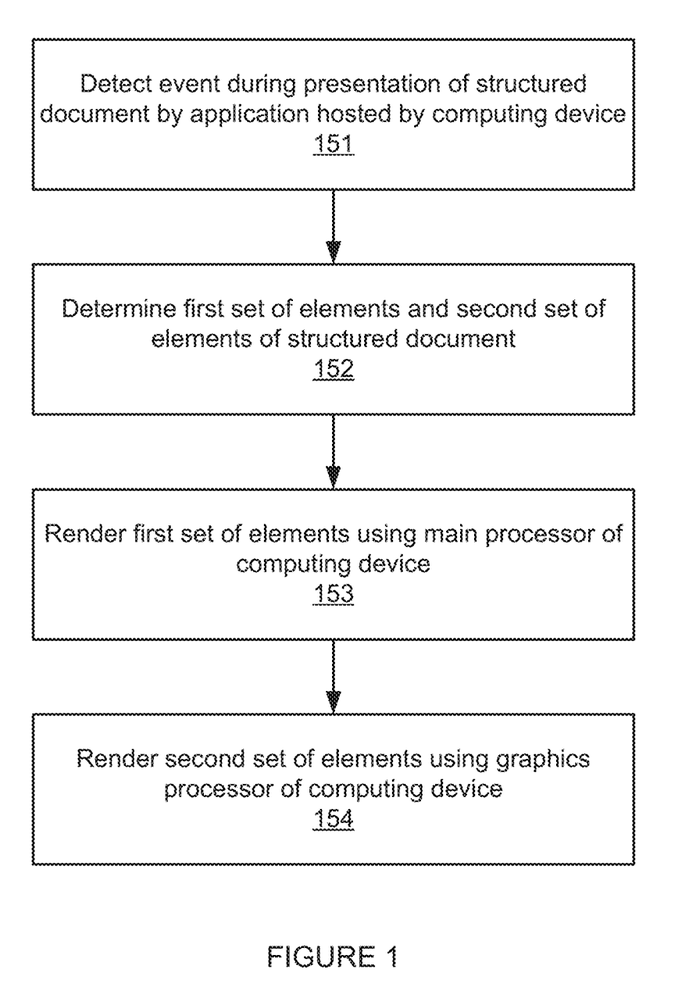
FIG. 1 illustrates an example method for rendering a structured document.

FIG. 1 illustrates an example method for rendering a structured document. In particular embodiments, an application executed by one or more main processors of a computing device may display a structured document in the application's graphical user interface (GUI) shown in a display of the computing device. The example method of FIG. 1 can be implemented with a rendering process in connection with the application. In one embodiment, the rendering process may be implemented with JAVASCRIPT. In particular embodiments, the graphical user interface may be scrollable along at least one axis relative to the display (e.g., vertical direction, or horizontal direction).

Figure 2:
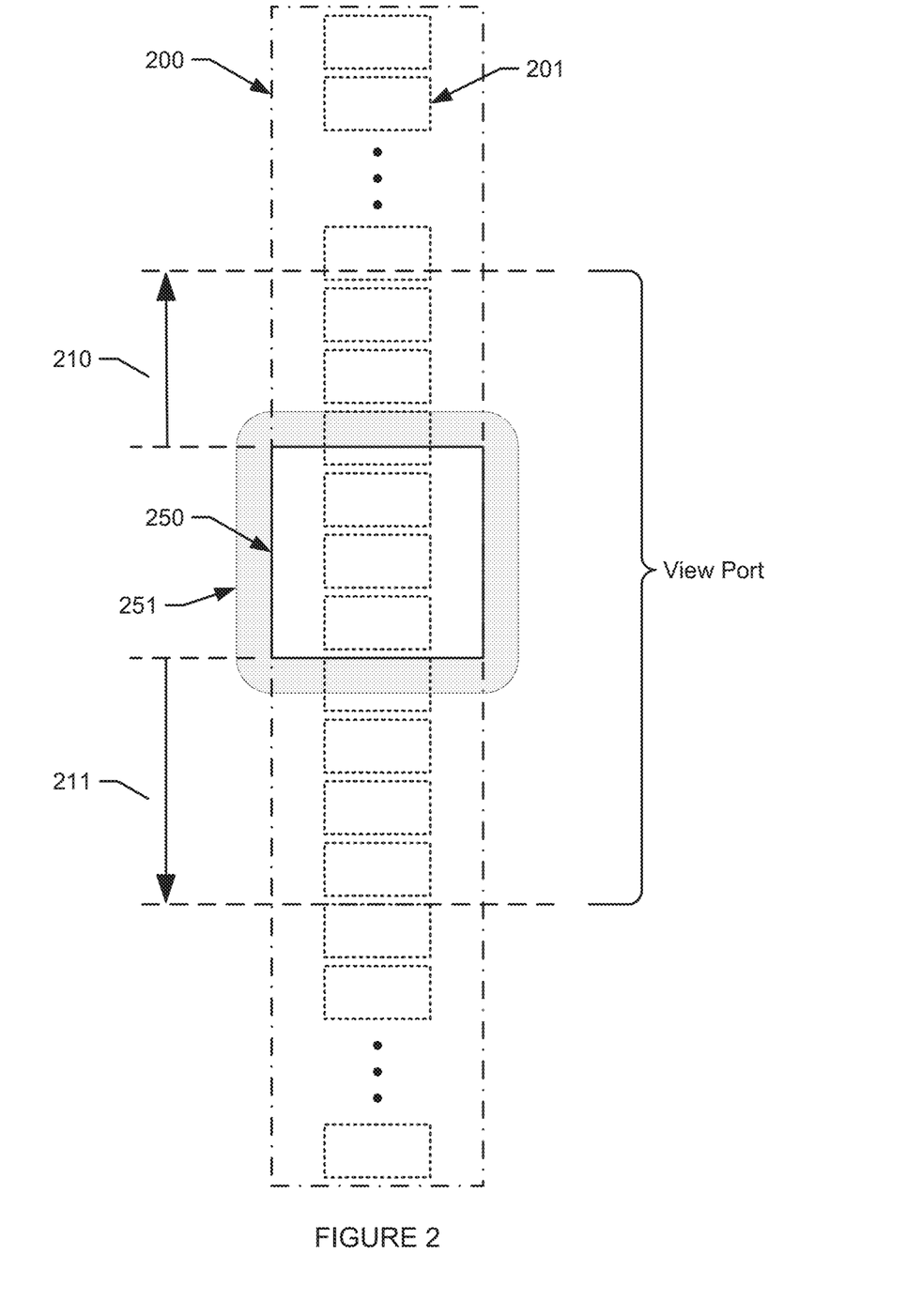
FIG. 2 illustrates an example structured document (which may be a web page).
Figure 3A:
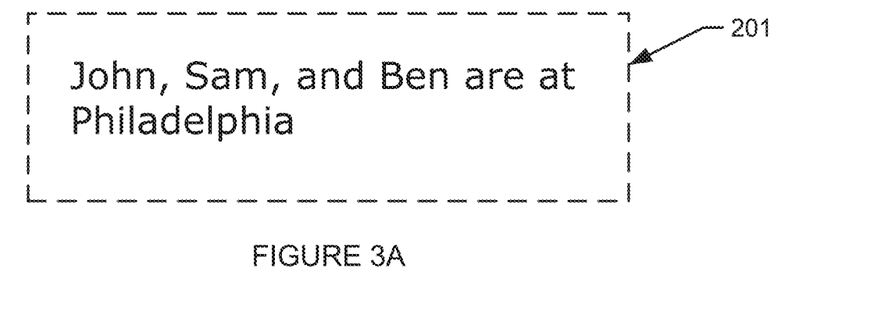
FIGS. 3A-3C illustrates example elements of the example structured document of FIG. 2.
Figure 3B:
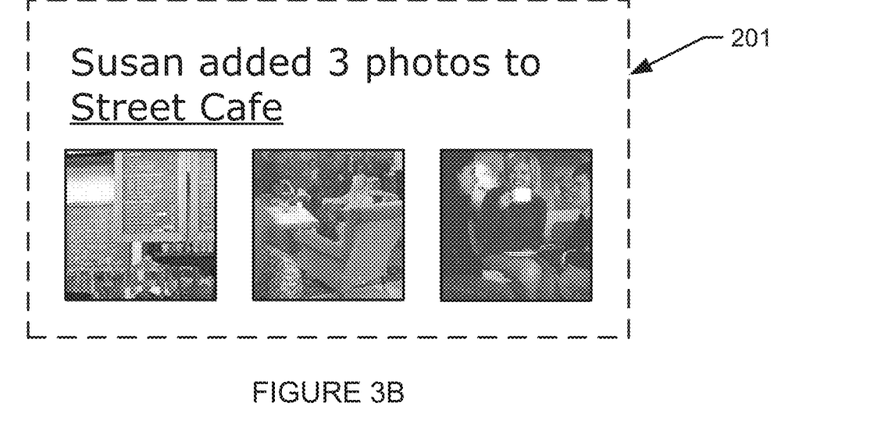

In particular embodiments, the rendering process may detect an event during presentation of the structured document (151). For example, an event can be a scrolling event by a user viewing the structured document presented in the graphical user interface. For example, the user may use a mouse or a pointing device to drag up or down a scrolling bar of the graphical user interface. For example, the user may use a swiping gesture on a touch screen displaying the graphical user interface. The rendering process or the application may register a handler function as a listener to such a scrolling event. In response to the event, in particular embodiments, the rendering process may determine a first set of elements and a second set of elements of the structured document (152). FIG. 2 illustrates an example structured document 200 such as a web page. Structured document 200 may comprise a plurality of elements while a portion of elements is displayed within a graphical user interface 250 of an application hosted by a computing device 251. An element may be a frame 201 (e.g., based on HTML <div> or <iframe> tags) as illustrated in FIG. 2. An element may be text or a text string. FIG. 3A illustrates a frame (201) containing a text string. An element may be media data (e.g., images, video clips, or animation). FIG. 3B illustrates a frame (201) containing a text string and three images. In particular embodiments, the first set of elements may comprise one or more frames comprising text content of the structured document. In particular embodiments, the second set of elements may comprise one or more media content. That is, the first set of elements may comprise content that requires less computing resources for rendering (e.g., frames, text), while the second set of elements may comprise content that requires more computing resources for rendering (e.g., media content). Furthermore, the second set of elements may comprise one or more media content within one or more region of the structured document. For example, the second set of elements may comprise one or more media content within one or more regions (also known as "view port") of the structured document that the user is viewing or the user is likely to view after the scrolling event. For example, as illustrated in FIG. 2, the rendering process may determine, for the second set of elements, a first region encompassing graphical user interface 250 (i.e., a region that the user is viewing), a second region 210 above graphical user interface 250 (i.e., a region that the user is likely to view after scrolling up the graphical user interface), and a third region 211 below graphical user interface 250 (i.e., a region that the user is likely to view after scrolling down the graphical user interface). For example, the second region 210 may encompass elements within 500 pixels from the top edge of graphical user interface 250. For example the third region 211 may encompass elements within 1000 pixels from the bottom edge of graphical user interface 250. The third region 211 below graphical user interface 250 can be larger than the second region 210 above graphical user interface 250 if the user is more likely to scroll down the graphical user interface. In one embodiment, the rendering process may determine a size of the view port, based on a pre-determined scrolling frame rate, available processing resources and available main memory resource, by using any optimization algorithm such as bin-packing, ant-hill optimization or similar.

Figure 3C:
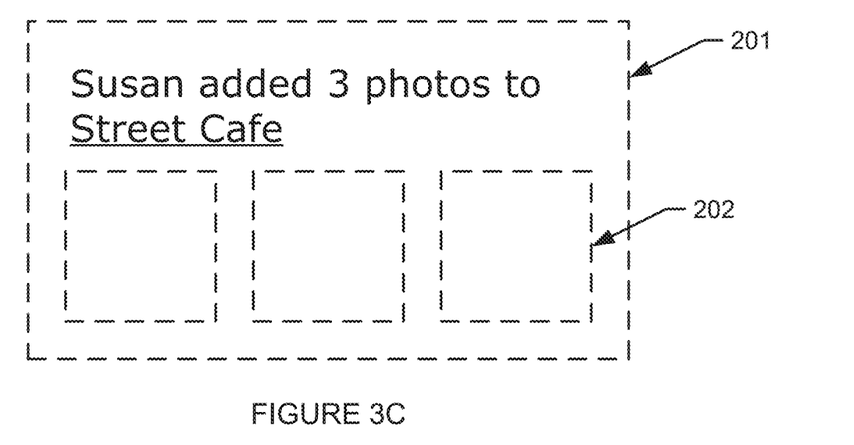

In particular embodiments, the rendering process may cause one or more of the main processors of the computing device to render the first set of elements of the structured document for presentation in the graphical user interface (153). In particular embodiments, the rendering process may cause one or more graphics processors of the computing device to render the second set of elements of the structured document for presentation in the graphical user interface (154). That is, particular embodiments may render frame and text elements (of the whole structured document) by using the main processors of the computing device, while accelerating rendering performance by using the one or more graphics processors for rendering media content within the one or more regions of the structured document (e.g., regions that the user is viewing or is likely to view after the event). By relieving the main processors for rendering media content, particular embodiments may also improve scrolling performance (e.g., higher scrolling frame rate) executed by the main processors. By rendering frame and text elements outside the one or more regions of the structured document, particular embodiments may provide the user sufficient information without further burden on hardware resources. For example, particular embodiments may render the example frame of FIG. 3B with only text content, as illustrated in FIG. 3C, if the example frame of FIG. 3B is outside the one or more regions described above. While the example frame of FIG. 3C may only have placeholders 202 in place of the actual images as illustrated in FIG. 3B, the text content in the example frame of FIG. 3C still present sufficient information to the user (e.g., what the placeholders 202 are about). For example, a placeholder 202 may be a frame, or a selectable icon indicating an available image. Particular embodiments may repeat the steps of the method of FIG. 1, where appropriate. Moreover, although this disclosure describes and illustrates particular steps of the method of FIG. 1 as occurring in a particular order, this disclosure contemplates any suitable steps of the method of FIG. 1 occurring in any suitable order. Furthermore, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1.

In addition to determining the one or more regions for the second set of elements based on likely user behavior (e.g., the user is likely to scroll up or down), particular embodiments may determine the second set of elements based on social factors of the user. For example, the second set of elements may comprise media content associated with other users who are within a pre-determined degrees of separation from the user in a social graph of a social networking system (e.g., the user's first-degree friends). For example, the rendering process may access one or more data stores for tagging information of the media content of the structured document, access one or more data stores for the user's social graph information, select media content that are tagged to the user's first-degree friends, and cause the one or more graphics processors of the computing device to render the selected media content for presentation of the structured document in the graphical user interface. For example, the rendering process may further cause the one or more graphics processors of the computing device to render one or more media content adjacent to the selected media content to improve visual experience for the user (e.g., a continuous segment of rendered media content is visually better than individually separated media content). A social networking system is further described later in this specification.

Yet in another embodiment, the rendering process may determine the second set of elements based on one or more preferences of the user. For example, the user may prefer viewing images to video clips. The user (or an application hosted by the computing device) may store the user's preference in a local storage (e.g., a hard disk drive, or a flash memory card) of the computing device. The rendering process may access the local storage for the user's preference, select images (not video clips) of the structured document, and cause the one or more graphics processors of the computing device to render the selected images for presentation of the structured document in the graphical user interface. In other embodiments, for example, a social networking system may also store the user's preference in one or more data stores of the social networking system. The rendering process may access the one or more data stores of the social networking system for the user's preference, select images (not video clips) of the structured document, and cause the one or more graphics processors of the computing device to render the selected images for presentation of the structured document in the graphical user interface.

Figure 4:
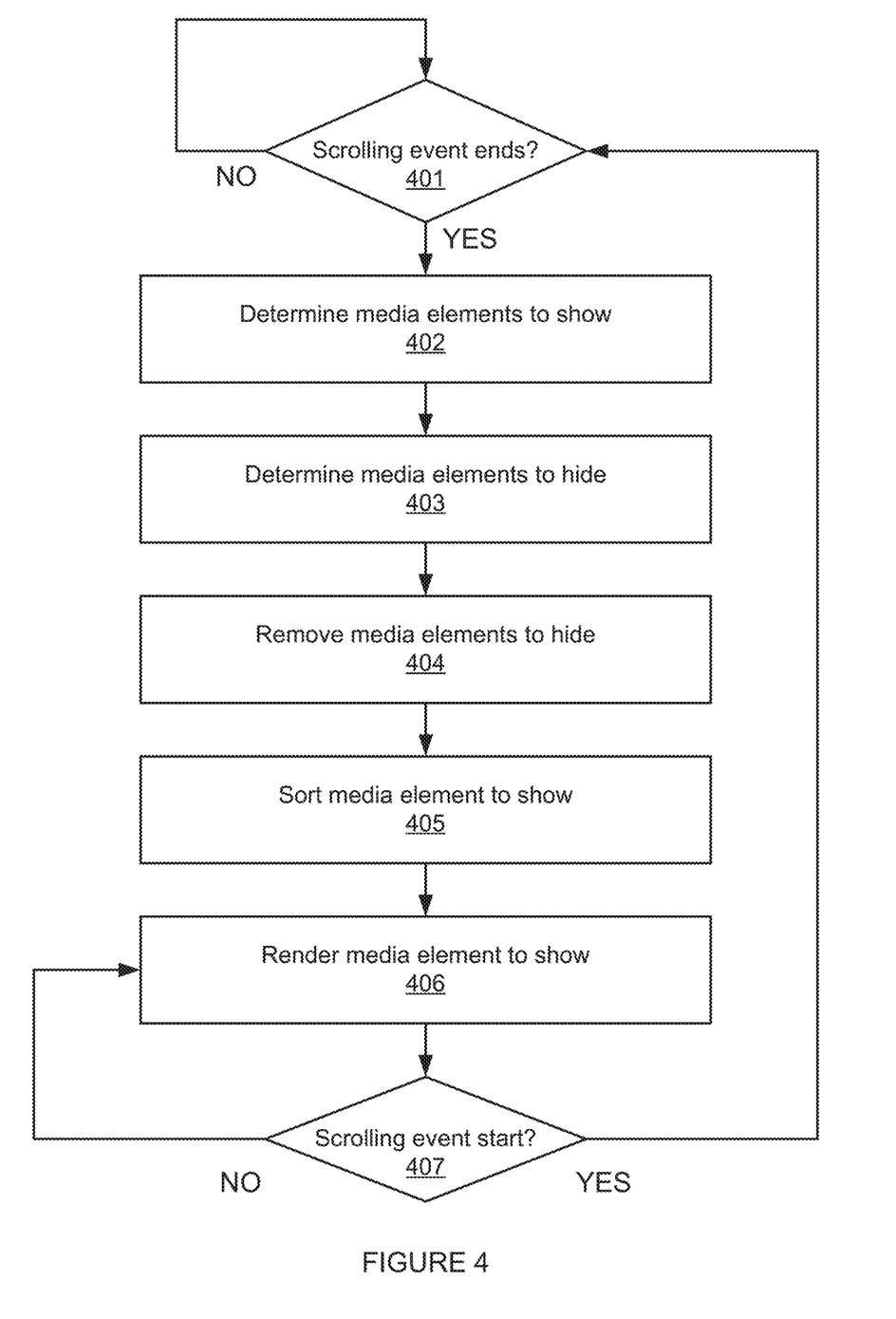
FIG. 4 illustrates an example method for rendering a structured document in response to a scrolling event.

FIG. 4 illustrates an example method for rendering a structured document in response to a scrolling event. In particular embodiments, in response to a scrolling event, the rendering process may determine whether the scrolling event has ended (401). For example, the rendering process may wait for a pre-determined period of time (e.g., 2 milliseconds) after the detection of the scrolling event to confirm the scrolling event has ended. In particular embodiments, the rendering process may determine one or more media elements (e.g., images, videos, or animations) to show in the graphical user interface, or the view port described earlier (402). In particular embodiments, the rendering process may determine one or more media elements to hide (from being shown) in the graphical user interface (403). For example, the rendering process may use a binary-search method to determine whether a media element is within the graphical user interface. In particular embodiments, the rendering process may remove media elements to hide (404). That is, the rendering process may remove rendered media elements that are no longer needed to be shown in the graphical user interface. In particular embodiments, the rendering process may sort the media elements to show in the graphical user interface (405). For example, the rendering process may sort the media elements by relative proximity to a center of the graphical user interface for the media elements to be shown in the graphical user interface. For example, the rendering process may create a sorted list of the media elements to show in the graphical user interface. In particular embodiments, the rendering process may cause one or more of the graphics processors of the computing device to render the medial elements to show one at a time. For example, the rendering process may cause one or more of the graphics processors of the computing device to render the first media element from the sorted list (406), wait for a pre-determined period of time (e.g., 2 milliseconds) to confirm that there is no more scrolling (407), cause one or more of the graphics processors of the computing device to render the next media element from the sorted list (406), and so on, until all the media elements in the sorted list are rendered by one or more of the graphics processors of the computing device. If the rendering process detects another scrolling event, the rendering process may wait until the scrolling event to end (401), and determine what media elements to show or hide in the graphical user interface (402, 403). In one embodiment, the rendering process may cause one or more of the graphics processors to render a media element by switching between CSS rules associated with the media element. In another embodiment, the rendering process may cause one or more of the graphics processors to render media elements by creating one or more threads to be executed by one or more of the graphics processors. Particular embodiments may repeat the steps of the method of FIG. 4, where appropriate. Moreover, although this disclosure describes and illustrates particular steps of the method of FIG. 4 as occurring in a particular order, this disclosure contemplates any suitable steps of the method of FIG. 4 occurring in any suitable order. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

By way of example and not by way of limitation, code examples are provided below. For example, an image that does not use the following CSS property may be visible.

```
img.hideImage {
    display: none
}
```

For example, another CSS property illustrated below may cause an application (e.g., a web browser) hosted by a computing device to render an element and all of its content using graphics processors of the computing device:

```
.renderGPU {
    position: relative;
    -webkit-transform: translate3d(0,0,0) ;
    z-index: 2147483647;
}
```

For example, a markup language code example below illustrates a container holding some text, an image placeholder, and an image:

```
<div id="container">
    Some text content
    <div id="imagePlaceholder">
    <img src="https://[remote_host]/photo.jpg" />
</div>
```

For example, a JAVASCRIPT function below illustrates an example for applying (or not) rendering using graphics processors on a single container and show (or hide) the image it contains.

```
var renderGPU = function (enable, container_element,
image_placeholder, image_element) {
    if (enable) {
        // render the container using the CPU and make an image visible
        container_element.className = "renderGPU";
        // remove dimensions on the image placeholder
        image_placeholder.style.width = "0";
        image_placeholder.style.height = "0";
        // un-hide (show) the image
        image_element.className = "";
    } else {
        // render the container using the CPU, hide an image and display a placeholder
        container_element.className = "";
        // getBoundingClientRect is a functionality of the
JAVASCRIPT DOM API.
        // Other methods exists to retrieve the dimension of an element.
        var img_dimensions =
image_element.getBoundingClientRect(image_element);
        // set the width and height of the placeholder according to the image dimensions:
        image_placeholder.style.width =
```

-continued

```
            img_dimensions.width + 'px';
            image_placeholder.style.height =
img_dimensions.height + 'px';
            // hide the image
            image_element.className = "hideImage";
        }
    }
}
```

Particular embodiments may render media elements outside the graphical user interface (or the view port) in more than one direction relative to an axis of the display showing the graphical user interface. For example, a user may scroll up or down vertically the structured document 200 illustrated in FIG. 2. A frame within the view port illustrated in FIG. 2 may comprise a media wheel (a collection of images or video clips) slide-able in the horizontal direction. The rendering process may cause one or more of the graphics processors of the computing device to render the images or video clips of the media wheel in conjunction with rendering other media content within the view port. For example, for a map application displaying a map in its graphical user interface, particular embodiments may cause one or more of the graphics processors of the computing device to render images (e.g., map tiles) in a direction of a highway route (that's not necessarily in parallel to an axis of a display showing the graphical user interface) outside the graphical user interface, before a user of the map application transitions (pans) the graphical user interface along the highway route.

A social-networking system, such as a social-networking website, may enable its users to interact with it and with each other through it. The social-networking system may create and store a record (such as a user profile) associated with the user. The user profile may include demographic information on the user, communication-channel information for the user, and personal interests of the user. The social-networking system may also create and store a record of the user's relationships with other users in the social-networking system (e.g. a social graph), as well as provide social-networking services (e.g. wall-posts, photo-sharing, or instant-messaging) to facilitate social interaction between or among users in the social-networking system.

A social networking system may store records of users and relationships between users in a social graph comprising a plurality of user nodes, a plurality of concept nodes, and a plurality of edges connecting the nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various system, including the social networking system. For example, the user may provide his name, profile picture, contact information, birth date, gender, marital status, family status, employment, education background, preferences, interests, and other demographical information to be included in the user node. Each user node of the social graph may correspond to a web page (typically known as a profile page). For example, in response to a request including a user name, the social networking system can access a user node corresponding to the user name, and construct a profile page including the name, a profile picture, and other information associated with the user. A concept node may correspond to a concept of the social networking system. For example, a concept can represent a real-world entity, such as a movie, a song, a sports team, a celebrity, a restaurant, or a place or a location. An administrative user of a concept node corresponding to a concept may create the concept node by providing information of the concept (e.g., by filling out an online form), causing the social networking system to create a concept node comprising information associate with the concept. Each concept node of the social graph may correspond to a web page. For example, in response to a request including a name, the social networking system can access a concept node corresponding to the name, and construct a web page including the name and other information associated with the concept. An edge between a pair of nodes may represent a relationship between the pair of nodes. For example, an edge between two user nodes can represent a friendship between two users. For example, the social networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social networking system a request to create an edge between a user node of the user and a concept node of the concept, indicating a relationship between the user and the concept (e.g., the user checks in a restaurant, or the user likes a celebrity). In addition, the degree of separation between any tow nodes is defined as the minimum number of hops required to traverse the social graph from one node to the other. A degree of separation between two nodes can be considered a measure of relatedness between the users or the concepts represented by the two nodes in the social graph.

A social networking system may support a variety of applications, such as photo sharing, on-line calendars and events, and instant messaging. For example, the social networking system may also include media sharing capabilities. For example, the social networking system may allow users to post photographs and other multimedia files to a user's profile page (typically known as wall posts) or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

Figure 5:
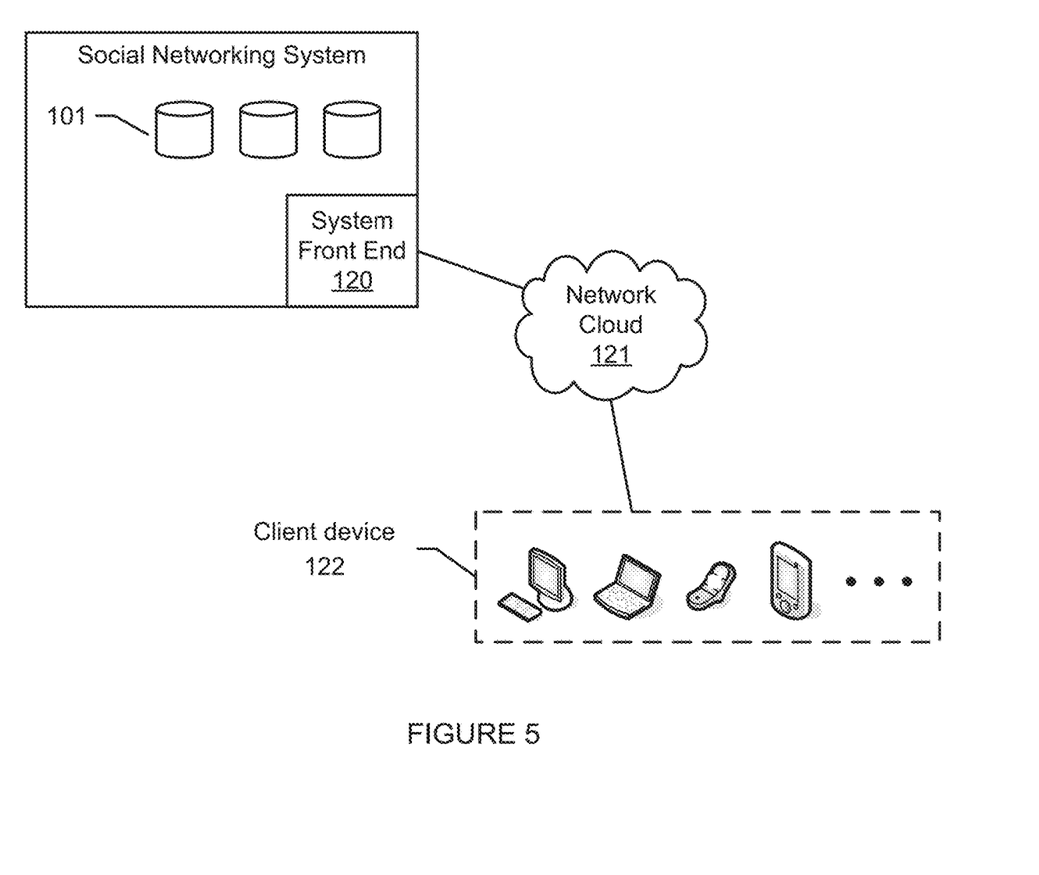
FIG. 5 illustrates an example network environment of a social-networking system.

FIG. 5 illustrates an example network environment of a social-networking system. In particular embodiments, a social networking system may comprise one or more data stores 101. For example, the social networking system may store user profile data and social graph information in data stores 101. For example, each data store 101 may comprise one or more storage devices. In particular embodiments, the social networking system may comprise one or more computing devices (e.g., servers) hosting functionality directed to operation of the social networking system. In particular embodiments, one or more of data stores 101 may be operably connected to the social networking system's front end 120. A user of the social networking system may access the social networking system using a client device such as client device 122. In particular embodiments, front end 120 may interact with client device 122 through network cloud 121. For example, front end 120 may be implemented in software programs hosted by one or more computing devices of the social networking system. Front end 120 may include web or HTTP server functionality, as well as other functionality, to allow users to access the social networking system.

Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, an electronic book reader, or mobile gaming device, among other suitable computing devices. Client device 122 may execute one or more client applications, such as a web browser (e.g., MICROSOFT INTERNET EXPLORER, MOZILLA FIREFOX, APPLE SAFARI, GOOGLE CHROME, OPERA, etc.) or special-purpose client application (e.g., MICROSOFT OUTLOOK, FACEBOOK for IPHONE, etc.), to access or view content over a computer network.

Network cloud 121 may represent a network or collection of networks (such as the Internet, a corporate intranet, a virtual private network, a local area network, a wireless local area network, a cellular network, a wide area network, a metropolitan area network, or a combination of two or more such networks) over which client devices 122 may access the social network system.

In particular embodiments, the social networking system may store in data stores 101 data associated with applications and services provided by the social networking system. In particular embodiments, the social networking system may store user event data in data stores 101. For example, a user may register a new event by accessing a client application to define an event name, a time and a location, and cause the newly created event to be stored (e.g., as a concept node) in data stores 101. For example, a user may register with an existing event by accessing a client application to confirming attending the event, and cause the confirmation to be stored in data stores 101. For example, the social networking system may store the confirmation by creating an edge in a social graph between a user node corresponding to the user and a concept node corresponding to the event, and store the edge in data stores 101.

In particular embodiments, the social networking system may store media files in data stores 101. For example, a user can use a client application to upload a photo or a set of photos (often called a photo album), or a video or audio clip, to the social networking system, causing the social networking system to store the photos or clips in data stores 105. In particular embodiments, a media file stored in data stores 105 may contain metadata (often called "tags") associated with the media file. For example, a photo shot by a digital camera may contain metadata relating to file size, resolution, time stamp, name of the camera maker, and/or location (e.g., GPS coordinates). A user can add additional metadata values to a photo, or tag a photo, during or in connection with an upload process. Some examples of tags of a media file are author, title, comments, event names, time, location, names of people appearing in the media file, or user comment. For example, tags of a media file can be implemented with the Exchangeable image file format (Exif), or a modified version thereof. U.S. Pat. No. 7,945,653, herein incorporated by reference in its entirety and for all purposes, describes methods of enabling a first user of a social networking system to select a region of a photo and associate the selected region to a second user, and in response to a confirmation from the second user, storing the association in a database. For example, the social networking system may store the association between photo and the second user by creating an edge between a user node corresponding to the second user and a concept node corresponding to the photo, and store the edge in data stores 101.

Figure 6:
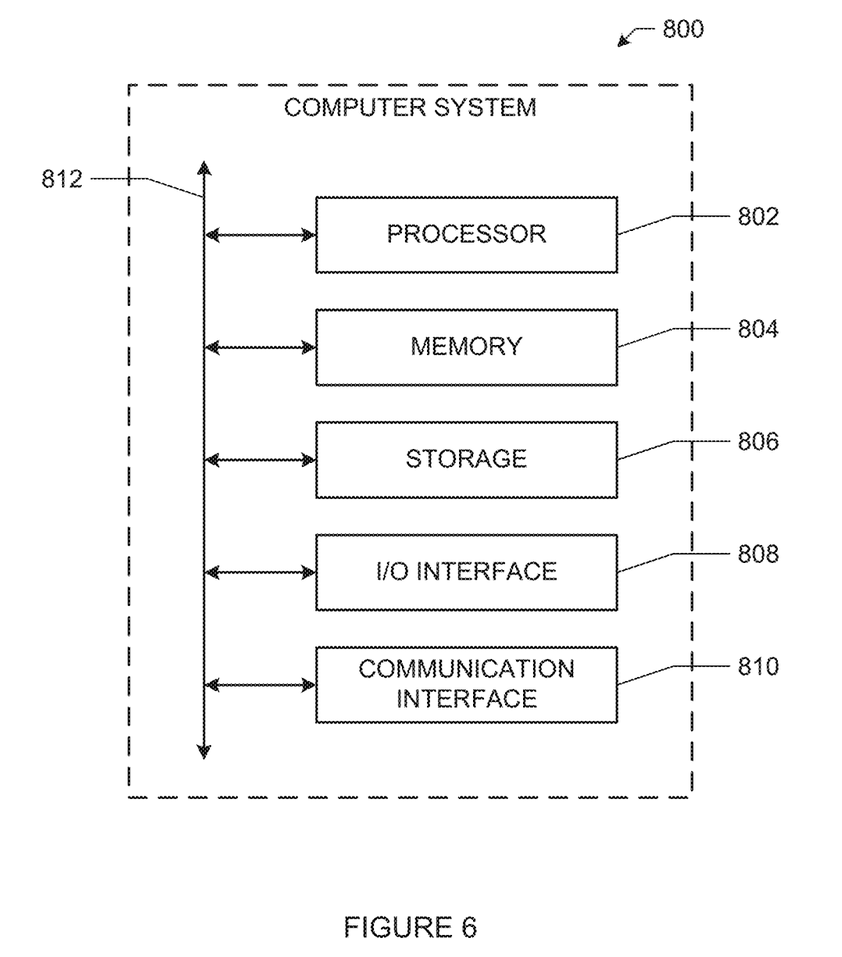
FIG. 6 illustrates an example computer system.

FIG. 6 illustrates an example computer system 800, which may be used with some embodiments of the present invention. This disclosure contemplates any suitable number of computer systems 800. This disclosure contemplates computer system 800 taking any suitable physical form. As example and not by way of limitation, computer system 800 may be an embedded computer system, a system-on-chip (SOC), a desktop computer system, a mobile computer system, a game console, a mainframe, a mesh of computer systems, a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. In particular embodiments, memory 804 includes main memory for storing instructions for processor 802 to execute or data for processor 802 to operate on. As an example and not by way of limitation, computer system 800 may load instructions from storage 806 to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM).

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), or flash memory or a combination of two or more of these.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, microphone, display, touch screen, mouse, speaker, camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) for communicating with an Ethernet or other wire-based network or a wireless NIC (WNIC) for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (e.g., a BLUETOOTH WPAN), a WI-FI network (e.g., a 802.11a/b/g/n WI-FI network,), a WI-MAX network, a cellular network (e.g., a Global System for Mobile Communications (GSM) network, a Long Term Evolution (LTE) network), or other suitable wireless network or a combination of two or more of these.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an INFINIBAND interconnect, a low-pin-count (LPC) bus, a memory bus, a Peripheral Component Interconnect Express or PCI-Express bus, a serial advanced technology attachment (SATA) bus, a Inter-Integrated Circuit (I2C) bus, a Secure Digital (SD) memory interface, a Secure Digital Input Output (SDIO) interface, a Universal Serial Bus (USB) bus, a General Purpose Input/Output (GPIO) bus, or another suitable bus or a combination of two or more of these. Bus 812 may include one or more buses 812, where appropriate.

Herein, reference to a computer-readable non-transitory storage medium may include a semiconductor-based or other integrated circuit (IC) (such as, for example, a field-programmable gate array (FPGA) or an application-specific IC (ASIC)), a hard disk drive (HDD), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable non-transitory storage medium, or a suitable combination of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. One or more computer-readable non-transitory storage media that stores instructions executable by one or more main processors of a device, wherein as the one or more main processors execute the instructions, the device:
   determines a first plurality of elements of a structured document that are currently presented by a graphical user interface of an application executed by the one or more main processors;
   determines a second plurality of elements, different from the first plurality of elements, of the structured document that can be presented by the graphical user interface and that are not currently presented by the graphical user interface;
   determines that the second plurality of elements include media content associated with at least one user within a number of degrees of separation from another user in a social graph of a social networking system; and
   before the structured document is scrolled to display the second plurality of elements, renders the second plurality of elements without rendering other elements of the structured document and relieves the one or more main processors from rendering the media content to thereby improve scrolling performance, in response to determining that the second plurality of elements include the media content associated with the at least one user within the number of degrees of separation from the other user in the social graph of the social networking system.

2. The one or more computer-readable non-transitory storage media of claim 1, wherein the media content are tagged to the at least one user.

3. The one or more computer-readable non-transitory storage media of claim 2, wherein the separation of the at least one user and the other user in the social graph of the social networking system is a first-degree separation.

4. The one or more computer-readable non-transitory storage media of claim 1, wherein the device includes one or more graphics processing units; and
   wherein when the device renders the second plurality of elements without rendering the other elements of the structured document, the device, by the one or more graphics processing units, renders the second plurality of elements without rendering the other elements of the structured document.

5. The one or more computer-readable non-transitory storage media of claim 4, wherein the device further:
   determines a third plurality of elements, different from the first plurality of elements and the second plurality of elements, of the structured document that can be presented by the graphical user interface and that are not currently presented by the graphical user interface; and
   by the one or more one or more main processors, renders the third plurality of elements without rendering other elements of the structured document.

6. The one or more computer-readable non-transitory storage media of claim 5, wherein the third plurality of elements are within a distance from a top edge of the graphical user interface.

7. The one or more computer-readable non-transitory storage media of claim 6, wherein the distance includes a number of pixels.

8. The one or more computer-readable non-transitory storage media of claim 1, wherein the device is a desktop computer, a laptop computer, a personal digital assistant (PDA), an in-car navigation system, an out-of-car navigation system, a smart phone, a cellular phone, a mobile phone, an electronic book reader, or a mobile gaming device.

9. A processor-implemented method, comprising:
   determining a first plurality of elements of a structured document that are currently presented by a graphical user interface of an application executed by one or more main processors;
   determining a second plurality of elements, different from the first plurality of elements, of the structured document that can be presented by the graphical user interface and that are not currently presented by the graphical user interface;
   determining that the second plurality of elements include media content associated with at least one user within a number of degrees of separation from another user in a social graph of a social networking system; and
   before the structured document is scrolled to display the second plurality of elements, rendering the second plurality of elements without rendering other elements of the structured document and relieves the one or more main processors from rendering the media content to thereby improve scrolling performance, in response to the determining that the second plurality of elements include the media content associated with the at least one user within the number of degrees of separation from the other user in the social graph of the social networking system.

10. The method of claim 9, wherein the media content are tagged to the at least one user.

11. The method of claim 10, wherein the separation of the at least one user and the other user in the social graph of the social networking system is a first-degree separation.

12. The method of claim 9, wherein the rendering the second plurality of elements without rendering the other elements of the structured document includes rendering, by the one or more graphics processing units, the second plurality of elements without rendering the other elements of the structured document.

13. The method of claim 12, further comprising:
   determining a third plurality of elements, different from the first plurality of elements and the second plurality of elements, of the structured document that can be presented by the graphical user interface and that are not currently presented by the graphical user interface; and
   by one or more main processors, rendering the third plurality of elements without rendering other elements of the structured document.

14. The method of claim 13, wherein the third plurality of elements are within a distance from a top edge of the graphical user interface.

15. The method of claim 14, wherein the distance includes a number of pixels.

16. A device comprising:
   one or more main processors; and
   a memory communicatively coupled to the one or more main processors;
   wherein as the one or more main processors execute the instructions, the device:
      determines a first plurality of elements of a structured document that are currently presented by a graphical user interface of an application executed by the one or more main processors;
      determines a second plurality of elements, different from the first plurality of elements, of the structured document that can be presented by the graphical user interface and that are not currently presented by the graphical user interface;
      determines that the second plurality of elements include media content associated with at least one user within a number of degrees of separation from another user in a social graph of a social networking system; and
      before the structured document is scrolled to display the second plurality of elements, renders the second plurality of elements without rendering other elements of the structured document and relieves the one or more main processors from rendering the media content to thereby improve scrolling performance, in response to determining that the second plurality of elements include the media content associated with the at least one user within the number of degrees of separation from the other user in the social graph of the social networking system.

17. The device of claim 16, wherein the media content are tagged to the at least one user.

18. The device of claim 17, wherein the separation of the at least one user and the other user in the social graph of the social networking system is a first-degree separation.

19. The device of claim 16, wherein the device includes one or more graphics processing units; and
- wherein when the device renders the second plurality of elements without rendering the other elements of the structured document, the device, by the one or more graphics processing units, renders the second plurality of elements without rendering the other elements of the structured document.

20. The device of claim 16, wherein the device is a desktop computer, a laptop computer, a personal digital assistant (PDA), an in-car navigation system, an out-of-car navigation system, a smart phone, a cellular phone, a mobile phone, an electronic book reader, or a mobile gaming device.

* * * * *